Dec. 18, 1928.  W. RUEPPEL ET AL  1,695,665

BRAKE

Filed Nov. 17, 1926

Inventor
Walter Rueppel
Loris Cone

By Herbert E. Smith

Attorney

Patented Dec. 18, 1928.

1,695,665

UNITED STATES PATENT OFFICE.

WALTER RUEPPEL AND LORIS CONE, OF PRINCETON, IDAHO, ASSIGNORS, BY MESNE ASSIGNMENTS, OF ONE-SIXTH TO BENNIE M. CONE AND ONE-SIXTH TO GIFFORD A. CONE, BOTH OF PRINCETON, IDAHO.

BRAKE.

Application filed November 17, 1926. Serial No. 148,866.

Our invention relates to improvements in wheel brakes of the friction clutch type and especially adapted for use in connection with automotive vehicle wheels. The brake of our invention is of the screw operated, axially movable class, employing co-acting rotary and non-rotary friction members in connection with a brake drum carried by the wheel, whereby the braking elements may be positively engaged to retard or stop the rotation of the wheel, and means are employed for normally retaining the friction members in inoperative position.

The invention consists in certain novel combinations and arrangements of parts as will hereinafter be more fully pointed out and claimed. In the accompanying drawings we have illustrated one complete example of the physical embodiment of our invention wherein the parts are combined and arranged in accordance with the best mode we have thus far devised for the practical application of the principles of our invention.

Figures 1, 2:
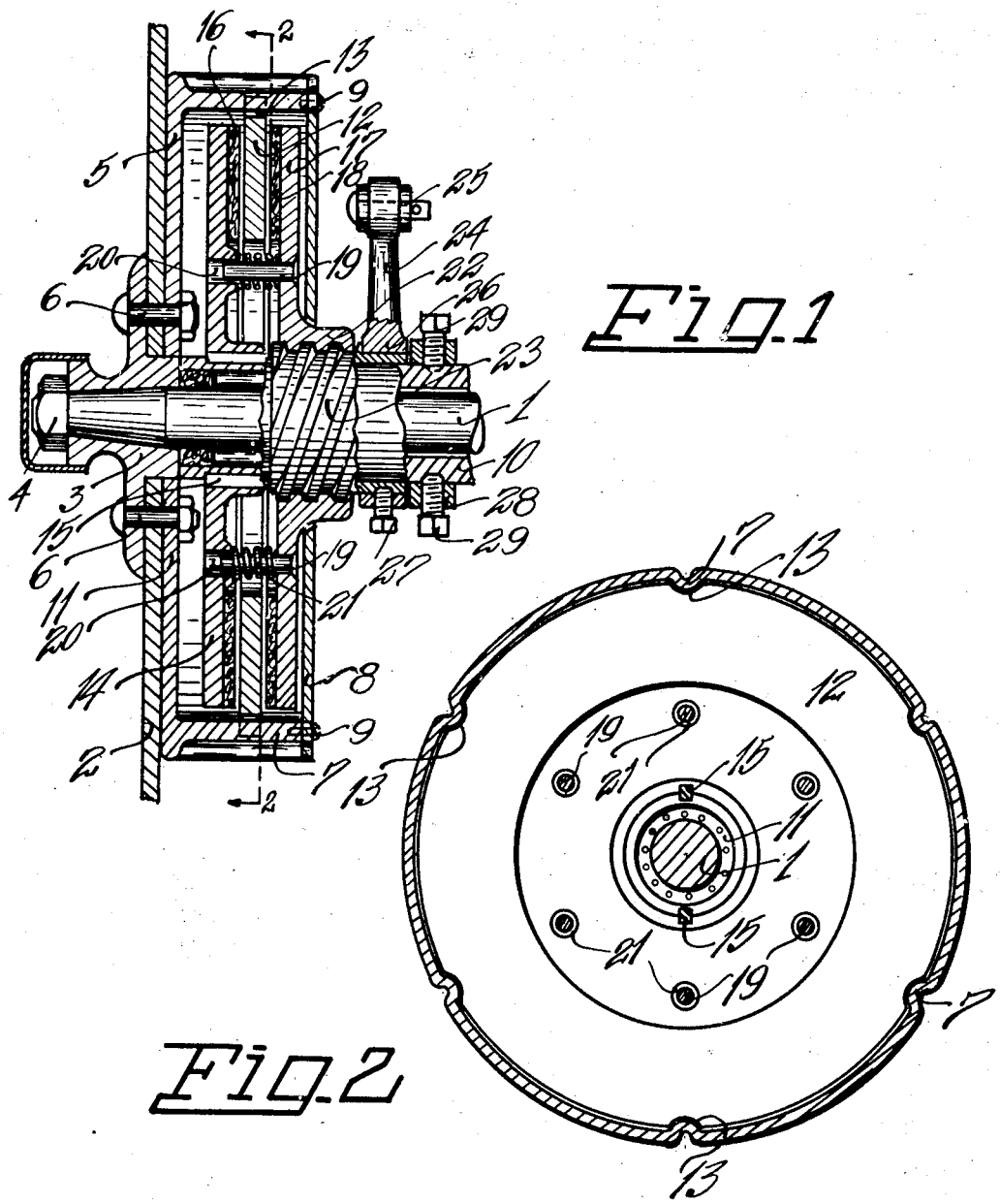
Figure 1 is a sectional detail view taken transversely of the hub portion of a wheel of the disk type showing the brake device of our invention applied thereto.
Figure 2 is a sectional view at line 2—2 of Figure 1.

In order that the general assembly and arrangement of parts may readily be understood we have illustrated in Figure 1 the usual axle journal 1 and a portion of a disk wheel 2 having a hub plate 3 and fastening nut 4. At the inner side of the wheel an open-side brake drum 5 is attached, as by bolts 6, which securely fasten together the wheel, hub plate and brake drum, as a rigid rotary member.

The rim of the brake drum is fashioned with a series of spaced, transversely extending ribs 7 that project from the inner face thereof, and a cover plate 8 of circular shape and fashioned with an open center is attached to the edge of the rim as by screws 9 to form a substantially dust-proof and water tight enclosure for the operating parts of the brake device.

One end of the tubular axle housing 10 is shown as encircling the axle journal and the usual roller bearings 11 are arranged between the fixed housing and the rotating journal 1. Within the brake drum is carried a laterally movable rotating friction ring 12 which rotates with the drum and wheel and is connected with the drum by means of peripheral notches 13 complementary to the series of ribs 7 of the drum. The ring is fashioned with an open center, and as it is loose with relation to the drum that carries it, it may be shifted laterally, or axially of the journal when the brake is applied.

At one side of the friction ring is located a stationary disk 14 with its integral hub keyed to the housing 10 as at 15, and on one of its faces this disk is provided with a friction lining 16 of suitable material for co-action with the adjoining face of the friction ring 12, when the ring is pressed or forced against the lining of the disk.

A second, non-rotary, but axially movable disk 17 is located at the opposite side of the friction ring and provided with a suitable lining 18 for co-action with the adjoining face of the ring. Thus when the brake is applied the axially movable but non-rotary disk 17 is forced into engagement with the axially movable and rotary friction ring for a gradual engagement of the friction members, and continued pressure applied to the disk 17 causes the ring to move laterally into close frictional engagement with the lining of the stationary disk 14, whereupon the three friction members are brought into the required engagement to brake the wheel.

The disks at the sides of the friction ring are normally held out of frictional engagement, and returned to this position after application of the brake, through the instrumentality of a series of pins 19 carried by the outer disk 17 and extending through the open center of the friction ring into complementary guide holes 20 in the stationary disk 14. Between the two disks and coiled about the pins 19 are carried springs 21 which normally separate the disks, are compressed when the brake is applied, and return the disks to normal position after release of the pressure.

For applying the brake we utilize a screw mechanism comprising an interiorly threaded hub 22 on the axially movable disk 17 which is mounted on an exteriorly threaded, rotary sleeve 23 carried on the axle housing 10. A usual brake lever 24 having operating connection at 25 is provided with a hub 26, and the hub is fixed to the threaded sleeve by means of a set bolt 27. The rotary, threaded sleeve and lever is retained in position by means of a collar 28 which is secured to the axle housing by means of one or more bolts 29.

Thus as the threaded sleeve is turned with its lever and guided between the fixed collar on the housing and the fixed hub of the disk 14, the threaded engagement of the sleeve with the threaded hub of disk 17 causes the latter to be shifted axially and into contact with the rotary friction ring 12 for application of the brake as heretofore described. A reverse swing of the lever and threaded sleeve causes disengagement of the frictional parts or members and the springs 21 assist in separating the disks.

Having thus fully described our invention, what we claim as new and desire to secure by Letters Patent is:

The combination with a drum having ribs and a friction ring having complementary notches, of an axle housing and a friction disk keyed thereon at one side of the ring, a disk located at the other side of the ring and laterally extending pins rigid therewith, said pins projecting into guide holes of the first disk and separating springs coiled about the pins between said disks, a threaded hub on one disk and a threaded sleeve within the hub mounted to turn on the housing, and a brake lever connected to said sleeve.

In testimony whereof we affix our signatures.

WALTER RUEPPEL.
LORIS CONE.